US008234285B1

(12) United States Patent
Cohen

(10) Patent No.: US 8,234,285 B1
(45) Date of Patent: Jul. 31, 2012

(54) CONTEXT-DEPENDENT SIMILARITY MEASUREMENTS

(75) Inventor: William W. Cohen, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 564 days.

(21) Appl. No.: 12/506,685

(22) Filed: Jul. 21, 2009

Related U.S. Application Data

(60) Provisional application No. 61/224,757, filed on Jul. 10, 2009.

(51) Int. Cl.
*G06F 7/00* (2006.01)
*G06F 17/30* (2006.01)

(52) U.S. Cl. .................................. 707/749; 707/771

(58) Field of Classification Search ........................ None
See application file for complete search history.

(56) References Cited

U.S. PATENT DOCUMENTS

| 6,738,759 | B1 * | 5/2004 | Wheeler et al. | 707/741 |
| 7,890,514 | B1 * | 2/2011 | Mohan et al. | 707/748 |
| 2011/0087680 | A1 * | 4/2011 | Murdock et al. | 707/749 |
| 2011/0106821 | A1 * | 5/2011 | Hassanzadeh et al. | 707/749 |

OTHER PUBLICATIONS

Hernandez et al., "Modeling Context Through Domain Ontologies", Inf Retrieval vol. 10, pp. 143-172, 2007, Springer.*
Yang et al., "ContextSeer: Context Search and Tecommendation at Query Time for Shared Consumer Products", MM'08, pp. 199-208, 2008, ACM.*
Li et al., "Video Search in Concept Subspace: A Text-Like Paradigm", CIVR'07, pp. 603-610, 2007, ACM.*
Aizawa, "An Information-Theoretic Perspective of TF-IDF Measures", Information Processing and Management vol. 39, pp. 45-65, 2003, Elsevier Science Ltd.*
Basu et al., "*Constrained Clustering: Advances in Algorithms, Theory, and Applications*." Chapman & Hall/CRC Press, pp. 1-462, 2008.
Bilenko et al., "Adaptive Name Matching in Information Integration." *IEEE Intelligent Systems*, 18(5): 16-23, Sep./Oct. 2003.
Cohen, "Data Integration Using Similarity Joins and a Word-Based Information Representation Language." *ACM Transactions on Information Systems*, 18(3):288-321, Jul. 2000.
Cohen and Hirsh, "Joins that Generalize: Text Classification Using WHIRL." in *Proceedings of the Fourth International Conference on Knowledge Discovery and Data Minings*, pp. 169-173, 1998.
Cohen et al., "A Comparison of String Distance Metrics for Name-Matching Tasks," in *Proceedings of the IJACI-2003 Workshop on Information Integration on the Web (IIWeb-03)*, 2003 (6 pages).
Dean & Ghemawat, "MapReduce: Simplified Data Processing on Large Clusters." in *OSDI'04: Sixth Symposium on Operating System Design and Implementation*, pp. 1-13, 2004.

(Continued)

*Primary Examiner* — Michael Hicks
(74) *Attorney, Agent, or Firm* — Fish & Richardson P.C.

(57) ABSTRACT

Methods, systems, and apparatus, including computer programs encoded on a computer storage medium, for determining similarity measures for objects in a dataset that include contextual associations of the objects with contexts. In one aspect, a method includes calculating a similarity measure for any two objects that include a common feature f based, in part, on the likelihood that the two object representations in the dataset that both include f will we associated with distinct contexts, and the likelihood that the two objects in the dataset that both include f will be associated with the same context.

18 Claims, 5 Drawing Sheets

OTHER PUBLICATIONS

Oyama and Tanaka, "Distance Metric Learning from Cannot-be-Linked Example Pairs, With Application to Name Disambiguation." in *Constrained Clustering: Advances in Algorithms, Theory, and Applications*, Chapman & Hall/CRC Press, pp. 357-374 2008.

Salton, "Automatic Text Processing." Addison Welsley, pp. 1-563, 1989.

Wagstaff and Cardie, "Clustering With Instance-Level Constraints." in *Proceedings of the International Conference on Machine Learning* (ICML), pp. 1103-1110, 2000.

* cited by examiner

CONTEXT-DEPENDENT SIMILARITY MEASUREMENTS

CROSS-REFERENCE TO RELATED APPLICATIONS

This application claims the benefit under 35 U.S.C. §119 (e) of U.S. Patent Application No. 61/224,757, titled "Context-Dependent Similarity Measurements," filed Jul. 10, 2009, which is incorporated herein by reference.

BACKGROUND

This specification relates to measuring the similarity of objects stored in datasets.

Heterogeneous datasets are datasets from several sources, each storing data representing objects. Each dataset includes an object identifier that identifies an object, a context value that identifies a context of the object, and a set of feature values that identify features of the object. The number of features and values often differ between each dataset, and within a dataset. Examples of such datasets are inventory catalog data from merchants, patient record data from hospitals, and technical paper data from publishers. For example, for inventory catalog data, an object identifier identifies a particular merchandise item, a context identifier identifies a particular vendor, and the set of feature values are words and numbers that describe the merchandise item.

Heterogeneous datasets are often integrated for data management, searching, and archiving operations. A common step in integrating heterogeneous datasets is determining a mapping between objects from one dataset and objects from another dataset. This step is often referred to as record linkage, matching, and/or de-duping. One useful matching strategy is to use a threshold similarity function that generates a similarity score from the feature values and identifies objects as identical if the similarity score exceeds a threshold value.

One widely-used similarity function is term frequency-inverse document frequency (TF-IDF) similarity. This similarity function identifies objects as similar if they are associated with a sufficient number of identical "terms". TF-IDF processing works well in many situations, and the resulting statistics can be stored in compact form. TF-IDF processing also facilitates parallelization, and thus can be efficiently scaled. Other similarity processes that are used include edit distance processes, Jaccard distance processes, and token-based processes.

However, these processes do not take into account the context of the objects. This can cause, is some situations, skewing of similarity measures. One example situation is when a particular context in a dataset includes many of the same feature values, e.g., the merchant's store name. The store name is not highly indicative of object similarity, as the merchant may sell a number of different products. However, the presence of the store name as a feature in the dataset for many objects in a particular context can increase a similarity measure for any two of those objects.

SUMMARY

This document describes processes for determining similarity measures for objects in a dataset that include contextual associations of the objects with contexts. A similarity measure for any two objects that include a common feature f is based, in part, on the likelihood that the two object representations in the dataset that both include the feature f will be associated with distinct contexts, and the likelihood that the two objects in the dataset that both include the feature f will be associated with the same context.

In general, one innovative aspect of the subject matter described in this specification can be embodied in methods that include the actions of selecting, by a data processing apparatus, object representations from a dataset storing a plurality of object representations, each object representation being an association of a object identifier that identifies an object instance in the dataset and corresponds to an object, a context value that identifies a context of the object, and a set of feature values that identify features of the object, and wherein each object identifier is unique in the dataset, and each context value is associated with one or more object identifiers; for each feature value, determining an inter-context score that is proportional to the number of different context values in the dataset that are associated with the feature value and determining an intra-context score that proportional to the number of times the feature value is associated with each context value; and for a selected pair of object representations, determining a similarity score based on an inter-context score and an intra-context score of a matching feature value in the set of features for the pair of object representations, the similarity score being a measure of the similarity of the object representations in the pair of object representations. Other embodiments of this aspect include corresponding systems, apparatus, and computer programs, configured to perform the actions of the methods, encoded on computer storage devices.

Another innovative aspect of the subject matter described in this specification can be embodied in methods that include the actions of selecting, by a data processing apparatus, object representations from a dataset storing a plurality of object representations, each object representation being an association of, a object identifier that identifies an object instance in the dataset and corresponds to an object; a context value that identifies a context of the object, and a set of feature values that identify features of the object, wherein each object identifier is unique in the dataset, and each context value is associated with one or more object identifiers; and generating feature weights and associating the feature weights with the feature values in the sets of features in the dataset, each feature weight for a feature value being proportional to the frequency of co-occurrence of the feature value with different context values in the dataset. Other embodiments of this aspect include corresponding systems, apparatus, and computer programs, configured to perform the actions of the methods, encoded on computer storage devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

1.0 Context-Dependent Similarity System Overview

Figure 1:
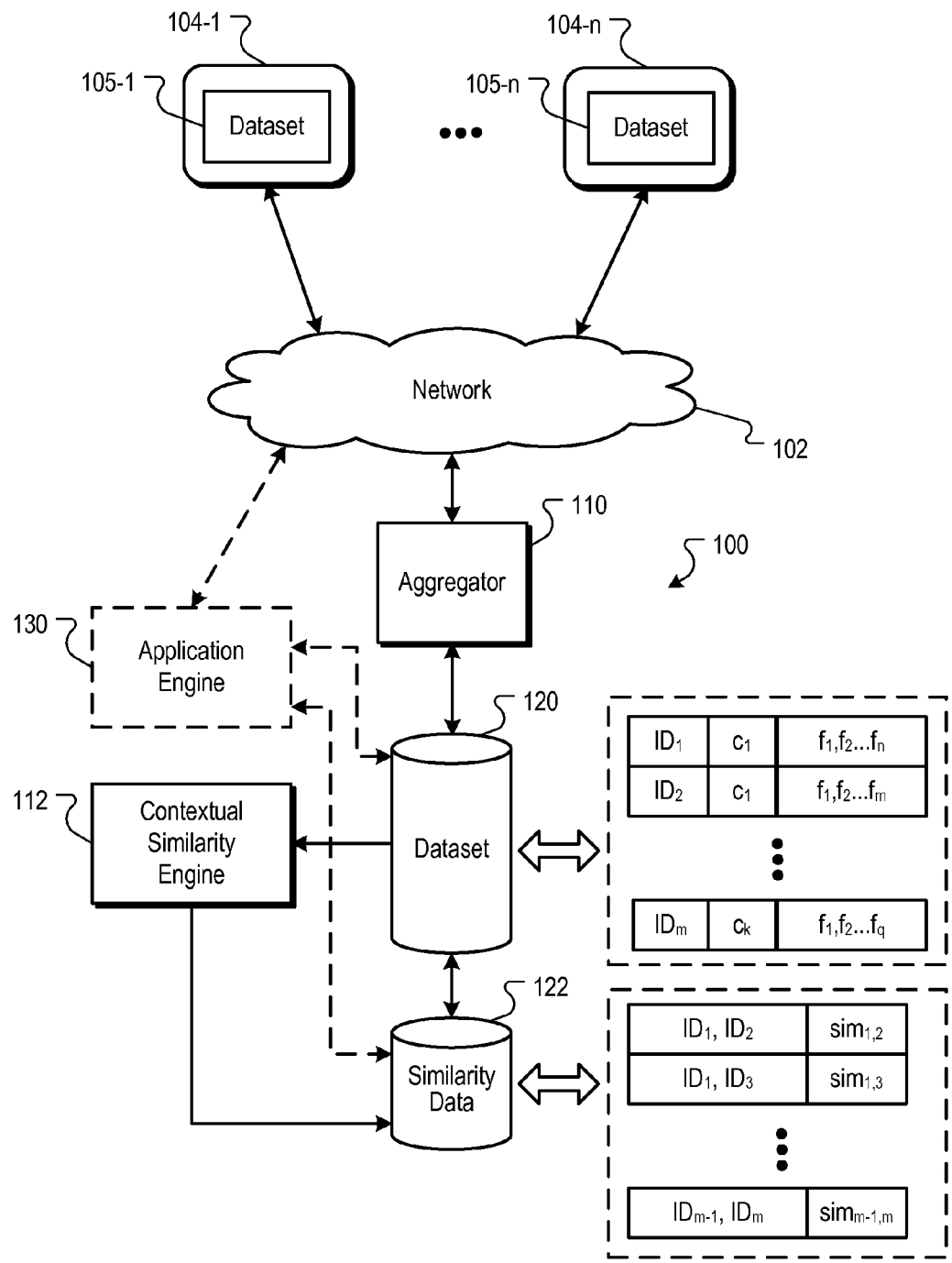
FIG. 1 is a block diagram of an example system for generating context-dependent similarity metrics.

FIG. 1 is a block diagram of an example system 100 for generating context-dependent similarity metrics. The system 100 can, for example, be in data communication with a computer network 102, such as a local area network (LAN), wide area network (WAN), the Internet, or a combination thereof. Data providers 104-1 . . . n can provide constituent datasets 105-1 . . . n to an aggregator 110. Example constituent datasets include inventory catalog data from merchants, patient record data from hospitals, and technical paper data from publishers, to name just a few. The aggregator 110 stores the received constituent datasets in a consolidated dataset 120. For clarity, the consolidated dataset will simply be referred to as dataset 120.

In some implementations, the datasets 105 can be web-based resources, and the data providers 104 can be web sites. Each web site 104 is one or more resources 105 associated with a domain name, and one or more servers host each web site, and each resource 105 is any data that can be provided by the web site 104 over the network 102 and that is associated with a resource address. Examples of resources include HTML pages, word processing documents, portable document format (PDF) documents, images, video, and feed sources, to name just a few. In these implementations, the aggregator 110 can crawl the websites and store the received resources in the dataset 120.

The dataset 120 is a collection of object representations $x_i$. Each object representation $x_i$ represents some object, e.g., a book, a merchandise item, a technical paper. Each object representation includes an object identifier $id(x_i)$, e.g., $ID_1$, $ID_2$ . . . $ID_m$ for i=1 . . . m; a context value $c(x_i)$, e.g., $c_1$ . . . $c_k$, and a set of feature values $F(x_i)$, e.g., $f_1, f_2 \ldots f_n$.

Each object identifier is unique in the dataset, and each context value is associated with one or more object identifiers. For example, the object identifiers $ID_1$ and $ID_2$ are associated with the context $c_1$. Assuming the object identifiers $ID_1$ and $ID_2$ correspond to two different products, and the context $c_1$ is a merchant name, then the two objects represented by the first and second object instances are provided by the same merchant. The set of features might be the words in the name of the product and copy describing the product.

A contextual similarity engine 112 accesses the dataset 120 and generates similarity data 122 that include similarity scores $sim_{m,n}$. Each similarity score $sim_{m,n}$ is a measure of the similarity of two object representations in a pair of object representations.

In some implementations, the contextual similarity engine 112 uses a modified TF-IDF process that accounts for the contexts of the object instances in the dataset 120. Let $V_D$ be the vocabulary associated with the dataset 120, i.e., $$V_D \equiv \bigcup_{x_i \in D} F(x_i)$$

The elements of $V_D$ are all features $f_1, \ldots f_{|D|}$.

Any set of feature values $F_i$ that are a subset of $V_D$ can also be represented as the vector $v(x_i)$, also written as $v_i$:

$$v_i = \langle a_1, \ldots a_{|V_D|} \rangle$$

where the k-th component $a_k$ is 1 if $f_k$ is in the set of feature values $F_i$, and 0 if $f_k$ is not within the set of feature values $F_i$.

The contextual similarity engine 112 generates the feature vectors v, and uses the feature vectors to determine the document frequency of the feature values $f_k$ with respect to the dataset 120. In particular, with D being the dataset 120 of object instances $x_1, \ldots x_n$, the document frequency of a feature value f with respect to the dataset 120 ("D") is defined as the number of object instances that include the feature f, i.e., $$DF_D(f)\{x_i \in D : f \in F(x_i)\}|$$

and the inverse frequency of the feature with respect to the dataset 120 is defined as:

$$IDF_D(f) \equiv \log\left(\frac{|D|}{DF_D(f)}\right)$$

The inverse frequency values of the feature values are used to generate an inverse frequency weighted vector $w_i$, i.e., $$w(x_i) = \langle b_1, \ldots, b_{|V_D|} \rangle$$

where the k-th component $b_k$ of $w_i$ is $a_k \cdot IDF_D(f_k)$.

For each feature $f_k$, contextual similarity engine 112 determines a context similarity value $CX(f_k)$, the details of which are described below. The contextual similarity engine 112 combines the frequency weighted vector $w_i$ with the context similarity values to generate a context-dependent inverse frequency weighted vector $z_1$, i.e., $$z(x_i) = \langle d_1, \ldots, d_{|V_D|} \rangle$$

where the k-th component $d_k$ $Z_i$ is $b_k \cdot CX(f_k) = a_k \cdot IDF_D(f_k) \cdot CX(f_k)$. In some implementations, the characteristics of the context similarity value are such that the magnitude is of the context similarity value is approximately proportional to the ratio of an estimated probability that two object instances in the dataset 120 that both include a feature value $f_k$ will be associated with distinct context values to the estimated probability that the two objects in the dataset 120 will be associated with the same context values.

The contextual similarity engine 112 can select any two object representations and determine a similarity score for the object representations from the context-dependent inverse frequency weighted vectors. In some implementations, the similarity score is cosine similarity score (also referred to as a TF-IDF similarity score), and is generated according to the equation:

$$sim_{CX-IDF}(x_i, x_j) \equiv \frac{z_i \cdot z_j}{\|z_i\| \cdot \|z_j\|}$$

where the numerator is the inner product of the two vectors $z_i$ and $z_j$.

The contextual similarity engine 112 associates the similarity scores for the pairs of object representations in similarity data 122. The similarity data 122 can be used, for example, by another application engine 130 to perform one or more data processing operations. For example, the application engine 130 can be a clustering engine that can generate cluster data representing object clusters. Alternatively, the application engine 130 can be a search engine that ranks object representations stored in the dataset 120 by relevance scores that measure the relevance of the object representations to a search query. The search engine can use the similarity data to, for example, identify duplicate object representations, web pages, etc., and either promote or demote the identified duplicates according to one or more search processing algorithms. Many other data processing operations that operate on the dataset 120 can also use the similarity data 122 as input.

2.0 Context-Dependent Similarity Measurements

As described above, the context-dependent similarity measurement is substantially proportional to the frequency of co-occurrence of the feature value with different context values in the dataset 120, and can be further inversely proportional to the frequency of occurrence of the feature value for each context value. In some implementations, the context-dependent similarity measurements are based on an inter-context score and an intra-context score associated with each feature value. In particular, the contextual similarity engine 112 determines, for each feature value, an inter-context score that is proportional to the number of different context values in the dataset that are associated with the feature value, and an intra-context score that proportional to the number of times the feature value is associated with each context value.

In some implementations, the inter-context score is a probability, $Pr^{INTER}$, that a random pair of object representations that each include a particular feature value are each associated with different context values, i.e., the probability that two object representations selected uniformly at random and that include the feature f are associated with different context values. Conversely, the intra-context score is a probability, $Pr^{INTRA}$, that a random pair of object representations that each include the particular feature value are each associated with the same context value, i.e., the probability that two object representations selected uniformly at random and that include the feature f are associated with same context value.

The contextual similarity engine 112 determines the inter-context scores and the intra-context scores for each feature according to the following formulas:

$$Pr^{INTER}(f) \equiv Pr(c_i \neq c_j \mid x_i \sim D_f \text{ and } x_j \sim D_f \text{ and } x_i \neq x_j) \quad (1)$$

$$= \sum_{c \in C_D} Pr(c_i = c \mid x_i \sim D_f) \cdot Pr(c_j \neq c \mid x_j \sim D_f - \{x_i\})$$

$$= \sum_{c \in C_D} \frac{n_{c,f}}{n_f} \cdot \frac{n_f - n_{c,f}}{n_f - 1}$$

$$Pr^{INTRA}(f) \equiv Pr(c_i = c_j \mid x_i \sim D_f \text{ and } x_j \sim D_f \text{ and } x_i \neq x_j) \quad (2)$$

$$= \sum_{c \in C_D} Pr(c_i = c \mid x_i \sim D_f) \cdot Pr(c_j = c \mid x_j \sim D_f - \{x_i\})$$

$$= \sum_{c \in C_D} \frac{n_{c,f}}{n_f} \cdot \frac{n_{c,f} - 1}{n_f - 1}$$

where:
n is the number of object representations in the dataset 120, i.e., $$n = |D|$$

$C_D$ is the set of contexts in the dataset, i.e., $$C_D \equiv \{c(x_i) : x_i \in D\}$$

$n_c$ is the number of object representations in the dataset associated with the context value c, i.e., $$n_c \equiv |\{x_i \in D : c_i = c\}|$$

$n_f$ is the number of object representations in the dataset that include the feature value f, i.e., $$n_f \equiv DF_D(f) \equiv |\{x_i \in D : f \in F_i\}|$$

$n_{c,f}$ is the number of instances in the dataset that include the feature value f and are associated with the context value c, i.e., $$n_{c,f} \equiv |\{x_i \in D : f \in F_i \text{ and } c_i = c\}|$$

$D_f$ is the instances in the dataset 120 (D) that include the feature f, i.e., $$D_f \equiv \{x_i \in D : f \in F_i\}$$

and $x \sim D_f$ denotes selecting the object representation x uniformly from $D_f$.

In some implementations, the contextual similarity engine 112 determines the context similarity value according to the following formula:

$$CX(f) \equiv \log \frac{Pr^{INTER}(f)}{Pr^{INTRA}(f)} \quad (3)$$

In some implementations, the contextual similarity engine 112 implements one or more smoothing or bounding operations when determining the inter-context and intra-context scores. The bounding and smoothing operations address the rare cases in which $n_f=1$ or $Pr^{INTRA}(f)=0$. In the former case, $CX(f)=1$ if $n_f=1$, which leaves the original feature weight unchanged. For the latter case, the estimates for $Pr^{INTRA}$ and $Pr^{INTER}$ are smoothed away from extreme values of 0 and 1. Example smoothing and bounding processes are described in section 5 below.

2.1 Example Contextual Similarity Processing of a Dataset

Consider the example dataset of Table 1 below. In Table 1, each object representation (row) corresponds to a product, and is identified by an identifier $id_i$. The feature set $F_i$ includes words in the name of the product and description of the product, and the context value $c_i$ identifies a merchant offering the product.

TABLE 1

| $id_i$ | $C_i$ | $F_i$ |
|---|---|---|
| us:gh1 | ToyCoUS | guitar, hero, IIIx, controller, from, ToyCoUS |
| us:gh2 | ToyCoUS | guitar, hero, for, gameboy, from, ToyCoUS |
| us:b14 | ToyCoUS | lego, bionicle, kit, x14, from, lego |
| us:b23 | ToyCoUS | lego, bionicle, kit, x23, from, lego |
| us:b37 | ToyCoUS | lego, bionicle, model, x37, from, lego |
| bb:gh2 | ToyCoBB | guitar, hero, IIIx, for, gameboy |
| bb:b14 | ToyCoBB | lego, bionicle, x14, truck, kit |
| bb:b23 | ToyCoBB | lego, bionicle, x23, zombie, kit |
| bb:b37 | ToyCoBB | lego, bionicle, x37, watermelon, kit |
| cc:gh2 | ToyCoCC | guitar, hero, IIIx, for, gameboy |
| cc:b14 | ToyCoCC | lego, bionicle, x14, truck, kit |
| cc:b23 | ToyCoCC | lego, bionicle, x23, zombie, kit |
| cc:b37 | ToyCoCC | lego, bionicle, x37, watermelon, kit |

For the dataset of Table 1, the feature weights ($IDF_D(f)$) for each feature are provided in Table 2:

TABLE 2

| Feature f | $IDF_D(f)$ |
|---|---|
| IIIx | 1.466 |
| bionicle | 0.368 |
| controller | 2.565 |
| for | 1.467 |
| from | 0.956 |
| gameboy | 1.467 |
| guitar | 1.179 |
| hero | 1.179 |
| kit | 0.486 |
| lego | 0.368 |
| model | 2.565 |
| ToyCoUS | 1.872 |
| truck | 1.872 |
| watermelon | 1.872 |
| x14 | 1.467 |
| x23 | 1.467 |
| x37 | 1.467 |
| zombie | 1.872 |

As the dataset of Table 1 is a product listing for merchants, any two object representations for the same context (i.e., any two products for the same merchant) are unlikely to be identical, as this would indicate a duplication of a product listing within a single merchant's dataset. Such duplications have been found to be unlikely. Additionally, many of the weights of Table 2 correlate to the intuitive notion of "importance" of the IDF function. For example, the features "from", "lego" and "bionicle" have relative low feature weights, as they are shared by many pairs of object representations. Conversely, the features "IIIx", "x14" and "x37" have higher weights, and appear in object representations that represent the same item offered by different merchants.

Note, however, the feature weight for ToyCoUS is larger than the feature weights of IIIx, x14 and x37. Additionally, the features IIIx, x14 and x37 co-occur with each context ToyCoUS, ToyCoBB, and ToyCoCC, and occur only once for each context. Conversely, the feature ToyCoUS occurs twice in the context of ToyCoUS, and does not occur in any other context. Thus, the context similarity values CX(ToyCoUS), CX(IIIx), CX(x14) and CX(x37) result in the feature weight of the feature ToyCoUS being less than the feature weights of the features IIIx, x14 and x37.

The effect of the feature weight adjustments are shown in Table 3 below, which lists the similarity measures for some of the pairs of object representations in the dataset of Table 1. The pairs that are below the line refer to different products, while the pairs that are above the line refer to the same product. The similarity measures in the column $\text{sim}_{IDF}(x_i, x_j)$ are calculated using the inverse frequency weighted vector w. The similarity measures in the column $\text{sim}_{CX\text{-}IDF}(x_i, x_j)$ are calculated using the inverse frequency weighted vector z that, in turn, is calculated from the vector w and smoothed values of CX(f).

TABLE 3

| Pair $id_i$, $id_j$ | $\text{sim}_{IDF}(x_i, x_j)$ | $\text{sim}_{CX\text{-}IDF}(x_i, x_j)$ |
|---|---|---|
| bb:b14, cc:b14 | 1.00 | 1.00 |
| bb:b23, cc:b23 | 1.00 | 1.00 |
| bb:b37, cc:b37 | 1.00 | 1.00 |
| bb:gh2, cc:gh2 | 1.00 | 1.00 |
| bb:b23, us:b23 | 0.86 | 0.99 |
| cc:b23, us:b23 | 0.86 | 0.99 |
| bb:gh2, us:gh2 | 0.82 | 0.84 |
| cc:gh2, us:gh2 | 0.82 | 0.84 |
| cc:b14, us:b14 | 0.57 | 0.88 |
| bb:b14, us:b14 | 0.57 | 0.88 |
| bb:b37, us:b37 | 0.31 | 0.85 |
| cc:b37, us:b37 | 0.31 | 0.85 |
| us:gh1, us:gh2 | 0.53 | 0.19 |
| bb:gh2, us:gh1 | 0.46 | 0.62 |
| cc:gh2, us:gh1 | 0.46 | 0.62 |

As shown in Table 3, the similarity measures $\text{sim}_{CX\text{-}IDF}(x_i, x_j)$ take into account the contexts of the features.

3.0 Example Contextual Similarity Processes

Figure 2:
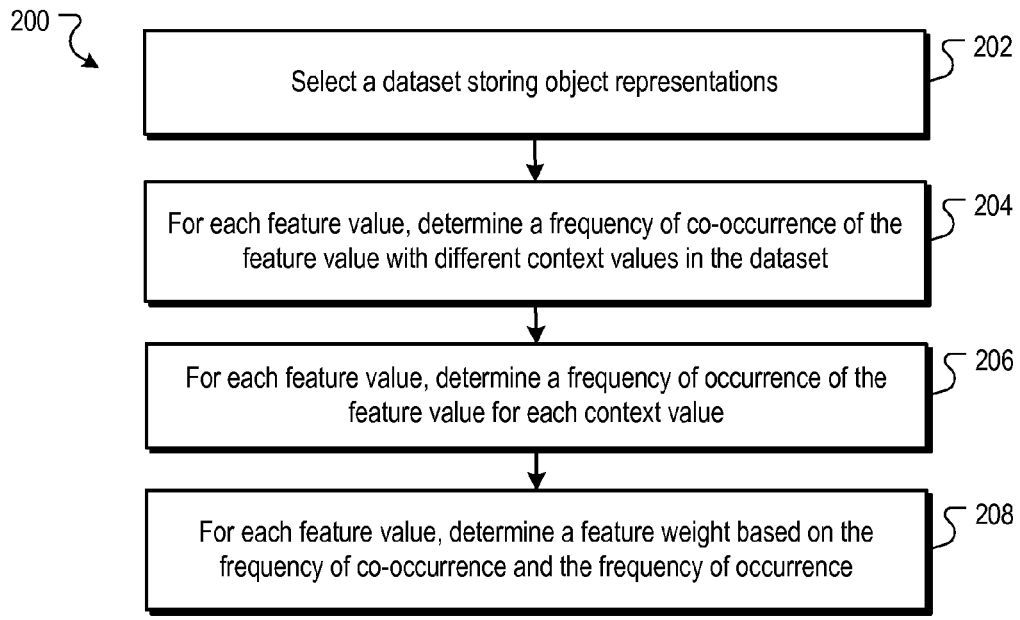
FIG. 2 is a flow diagram of an example process for generating context-dependent feature weights.

FIG. 2 is a flow diagram of an example process 200 for generating context-dependent feature weights. The process 200 can be implemented in the contextual similarity engine 112.

The process 200 selects a dataset storing object representations (202). For example, the contextual similarity engine 112 can select the dataset 120. The dataset 120 includes a plurality of object representations, each object representation being an association of an object identifier that identifies an object instance in a dataset and corresponds to an object, a context value that identifies a context of the object, and a set of feature values that identify features of the object.

For each feature value, the process 200 determines a frequency of co-occurrence of the feature value with different context values in the dataset (204). For example, the contextual similarity engine 112 can determine the number of context values with which a feature value is associated.

For each feature value, the process 200 determines a frequency of occurrence of the feature value for each context value (206). For example, the contextual similarity engine 112 can determine, for each context value, the number of object representations that include the frequency value.

For each feature value, the process 200 determines a feature weight based on the frequency of co-occurrence and the frequency of occurrence (208). For example, the contextual similarity engine 112 can multiply an inverse frequency value for the feature value by another value that is proportional to the ratio of the frequency of co-occurrence to the frequency of occurrence.

Figure 3:
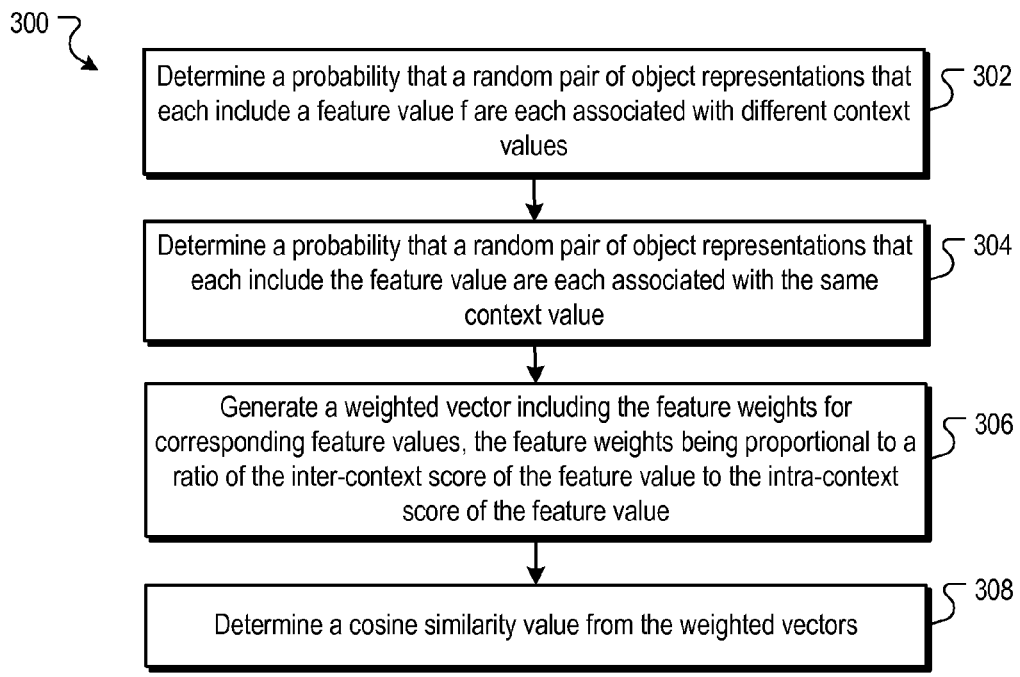
FIG. 3 is a flow diagram of an example process for generating a context-dependent similarity measure from feature weight vectors.

FIG. 3 is a flow diagram of an example process 300 for generating a context-dependent similarity measure from feature weight vectors. The process 300 can be implemented in the contextual similarity engine 112.

The process 300 determines a probability that a random pair of object representations that each include a feature value f are each associated with different context values (302). For example, the contextual similarity engine 112 can determine the value $\text{Pr}^{INTER}(f)$.

The process 300 determines a probability that a random pair of object representations that each include the feature value are each associated with the same context value (304). For example, the contextual similarity engine 112 can determine the value $\text{Pr}^{INTRA}(f)$.

The process 300 generates a weighted vector including the feature weights for corresponding feature values, the feature weights being proportional to a ratio of the inter-context score of the feature value to the intra-context score of the feature value (306). For example, the contextual similarity engine 112 can generate the vector w and multiply the feature weights of the vector by corresponding context similarity values CX to generate the vector z.

The process 300 determines a cosine similarity value from the weighted vectors. For example, the contextual similarity engine 112 can determine the value $\text{sim}_{CX\text{-}IDF}(x_i, x_j)$.

4.0 Example Process for Computing Context-Dependent IDF Similarity

Figure 4:
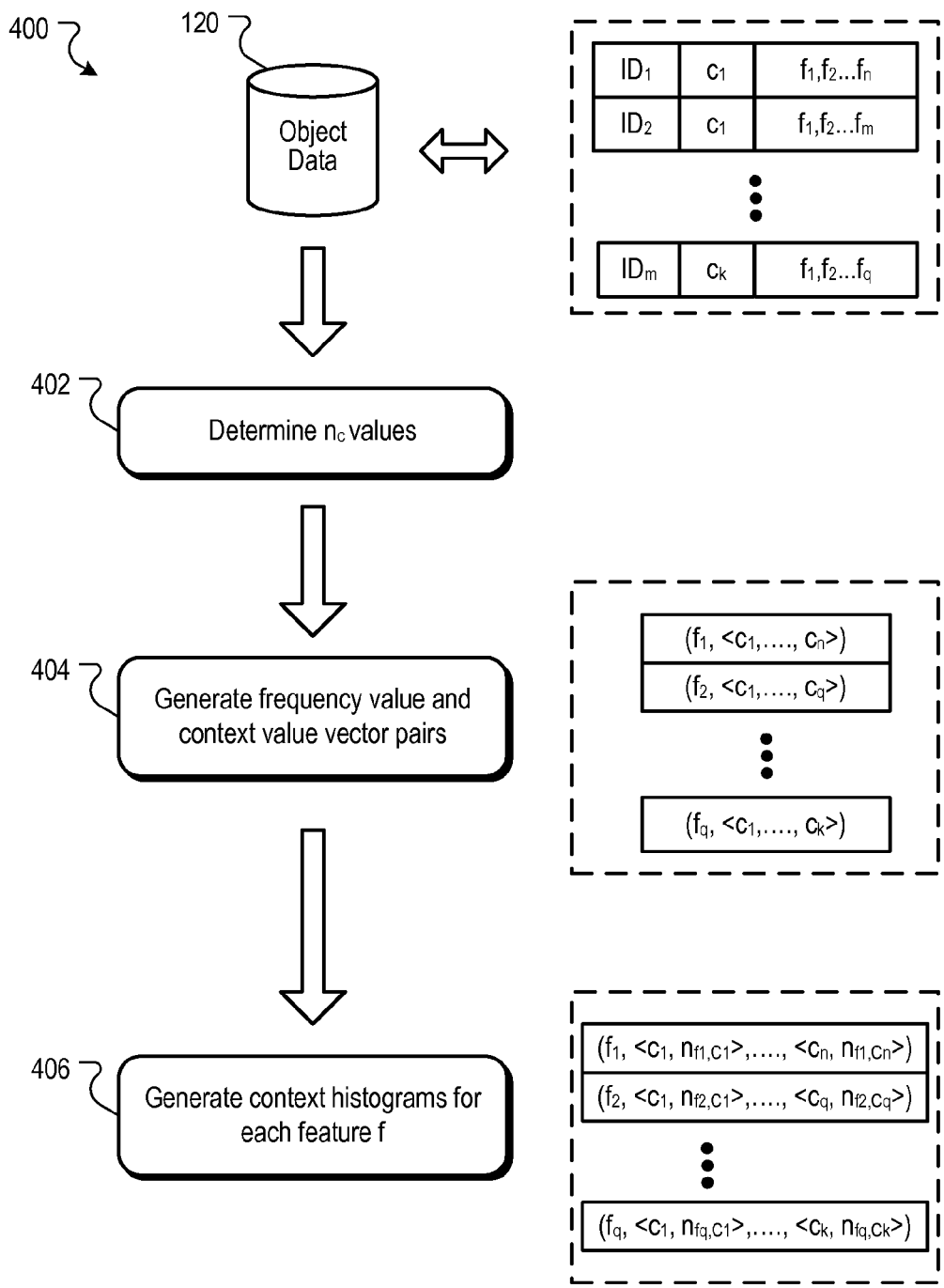
FIG. 4 is a block diagram illustrating an example process for generating context histograms.

FIG. 4 is a block diagram illustrating an example process 400 for generating context histograms. The process 400 facilitates parallelization among multiple computers in a data processing apparatus, e.g., distributing processing of the contextual similarity engine 112 over multiple computers.

The process 400 performs an initial pass over the dataset 120 to determine the frequencies of contexts ($n_c$) in the dataset 120 (402). Typically, there are only a few thousand distinct contexts, even for a very large dataset 120, and thus storing this information is not expensive.

Thereafter, the process 400 generates feature value and context value vector pairs (404). The feature value and context value vector pairs are of the form $$(f, \langle c_1, \ldots, c_n \rangle)$$

where f is a feature and $c_1, \ldots, c_n$ is a sorted list of all context values that co-occur with that feature.

The process 400 then generates context histograms for each feature f (406). The context histograms are of the form $$(f, \langle (c_1, n_{f,c1}), \ldots, (c_n, n_{f,cn}) \rangle)$$

where the pair ($c_i$, $n_{f,ci}$) contains a context and the number of times the context was duplicated for that feature. Because the feature weight CX(f)·IDF(f) for a feature f depends only on the context histogram off, the process 400 can be readily parallelized. For example, a first processor can be tasked with determining the feature weights for a particular context histogram for a first feature $f_1$, and a second processor can be tasked with determining the feature weights for a particular context histogram for a second feature $f_2$.

Figure 5:
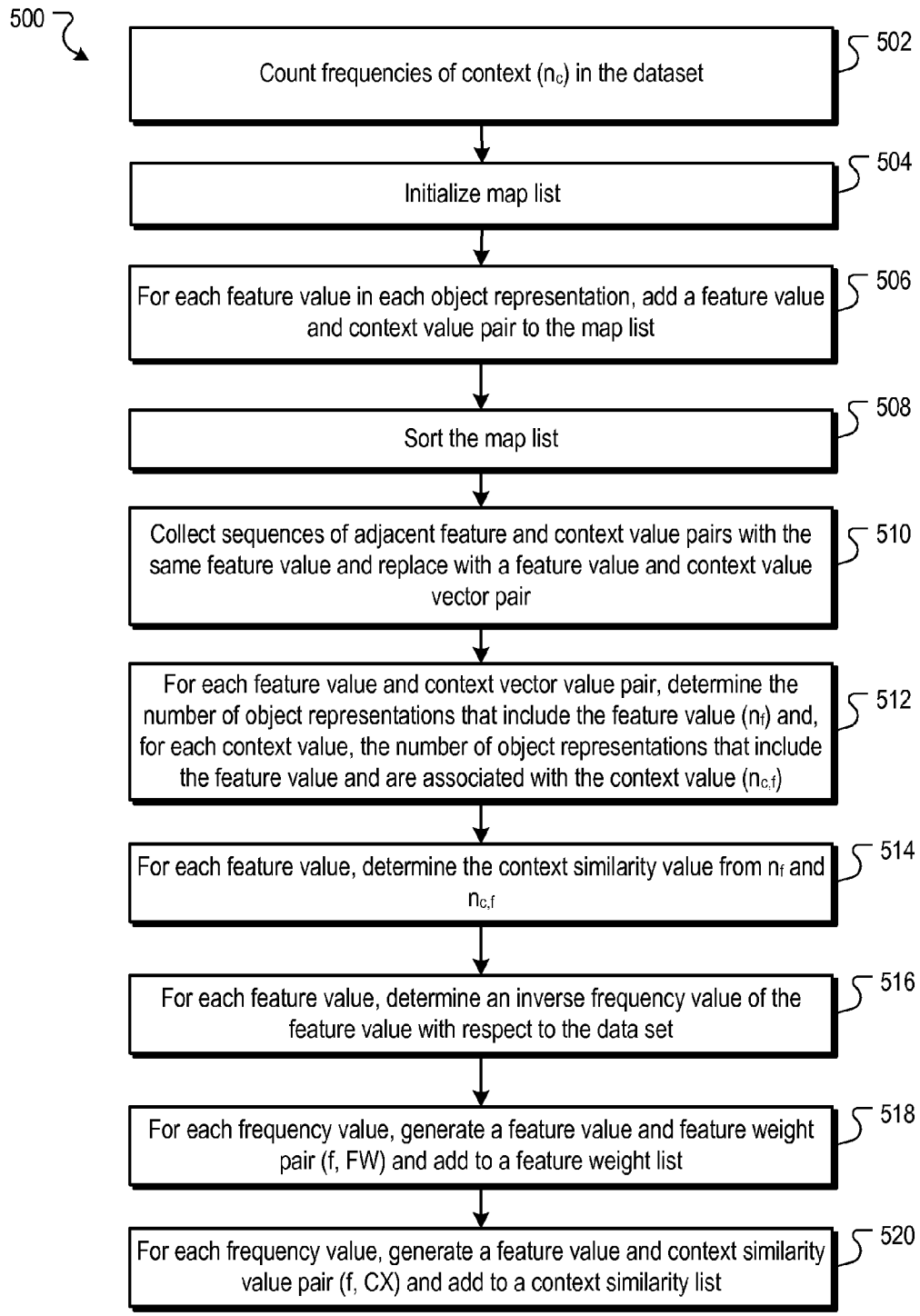
FIG. 5 is a flow diagram of an example process for generating context-dependent similarity measures from context histograms.

FIG. 5 is a flow diagram of an example process 500 for generating context-dependent similarity measures from context histograms. The process 500 can be implemented by the contextual similarity engine 112 operating in a parallelized environment.

The process 500 counts frequencies of context ($n_c$) in a dataset (502). For example, the contextual similarity engine 112 can, for each context c, initialize a context counter $n_c$ to 0, and set another context independent counter n to 0. For each object representation in the dataset, a context counter corresponding to the context value of the object representation is incremented. Additionally, the counter n is incremented for each object representation in the dataset.

The process 500 initializes a map list (504), and for each feature value in each object representation, adds a feature value and context value pair to the map list (506). For example, the contextual similarity engine 112 can initialize the map list and append the feature value and context value pairs (f, $c_i$) to the map list.

The process 500 sorts the map list (508). For example, the contextual similarity engine 112 can sort the map list lexicographically.

The process 500 collects sequences of adjacent feature and context value pairs with the same feature value and replaces them with a feature value and context value vector pair (510). For example, the contextual similarity engine 112 can collect sequences of adjacent pairs (f, $c_1$) . . . (f, $c_n$) with the same feature and replace them with a feature value and context value vector pair (f, $\langle c_1, \ldots c_n \rangle$).

The process 500, for each feature value and context vector value pair, determines the number of object representations that include the feature value ($n_f$) and, for each context value, determines the number of object representations that include the feature value and are associated with the context value ($n_{c,f}$) (512). For example, the contextual similarity engine 112 can, from the list $\langle c_1, \ldots c_n \rangle$, computer the feature value $n_f$ and the context value $n_{c,f}$ for each feature.

The process 500 determines, for each feature value, a context similarity value using $n_f$ and $n_{c,f}$ (514). For example, the contextual similarity engine 112 can determine the values CX(f) using equations (1)-(3) above. Alternatively, if smoothing is implemented, the contextual similarity engine 112 can determine the values CX(f) using equation (3) above and equations (4) and (5) below.

The process 500 determines, for each feature value, an inverse frequency value of the feature value with respect to the dataset (516). For example, the contextual similarity engine 112 can determine the values of IDF(f), e.g., $\log(n/n_f)$.

The process 500 generates, for each feature value, a feature value and feature weight pair (f, FW) and adds the feature value and feature weight pair to a feature weight list (518). For example, the contextual similarity engine 112 can generate the pair of values (f, CX(f)·IDF(f)) for each feature f and add the pair to a feature weight list.

The process 500 generates, for each feature value, a feature value and context similarity value pair (f, CX(f)) and adds the feature value and context similarity value pair to a context similarity list. For example, the contextual similarity engine 112 can generate the feature value and context similarity value pair (f, CX(f)) and add each pair to the context similarity list.

The data generated by the process 500 can be stored as the similarity data 122 and associated with the dataset 120.

5.0 Example Smoothing and Bounding Processes

As described above, the definitions of $Pr^{INTRA}(f)$ and $Pr^{INTER}(f)$ are maximum likelihood estimates, and it is possible for $Pr^{INTRA}(f)$ to have a value of 0, resulting in an indeterminate value for CX(f). If the system has prior knowledge of the importance of a feature f, this prior knowledge can be incorporated by smoothing the estimate toward these values. In general, if a quantity is estimated to be $p_1$ based on $m_1$ examples and the system is provided two values $p_0$, $m_0$ representing a prior probability $p_0$ and a "strength" (expressed in number of equivalent examples) $m_0$, then a Dirichlet-smoothed estimate of the following form can be used:

$$\hat{p} = p_1 \cdot \frac{m_1}{m_1 + m_0} + p_0 \cdot \frac{m_0}{m_1 + m_0} = \frac{p_1 m_1 + p_0 m_0}{m_1 + m_0}$$

In some implementations, $p_0$ is set to 0.5 and $m_0$ is set to 1.

In some implementations, the feature values of the dataset 120 are divided into disjoint sets $V_1 \ldots V_m$. Each disjoint set includes different types of features that are expected to have different levels of importance. For example, for a dataset related to movies, a first disjoint set of features can be from movie titles; a second disjoint set of features can be from director names; a third disjoint set of features can be from cast names; and a fourth disjoint set of features can be from movie summaries.

The CX(f) values are computed for each feature using the default priors, over each subset of features belonging to each disjoint set $V_l$, and the mean $\mu_1$ and standard deviation $\sigma_1$ for the values of CX(f) are determined. From these mean and standard deviation values, a prior value $p_1$ and a strength value $m_1$ are determined. In some implementations, the prior $p_1$, $m_1$ for features f that are in the disjoint set $V_l$ are set as:

$$p_l \equiv \frac{p_0 m_0 + p'_l m'_l}{m_0 + m'_l}$$

$$m_l \equiv m_0 + m'_l$$

where $p_0$, $m_0$ are initial values (e.g., 0.5 and 1) and:

$$p'_l = \mu_l$$

$$m'_l = \frac{\mu_l(1-\mu_l)}{\sigma_l^2}$$

Once $p_1$ and $m_1$ are determined, the CX(f) values are recomputed using the revised priors. This process is described in more detail with respect to FIG. 6 below.

The values of $Pr^{INTER}(f)$ and $Pr^{INTRA}(f)$ are smoothed towards $p_0$ and $m_0$:

$$Pr^{INTER}(f) \equiv Pr(c_i \neq c_j \mid x_i \sim D_f \text{ and } x_j \sim D_f \text{ and } x_i \neq x_j) \quad (4)$$

$$= \sum_{c \in C_D} Pr(c_i = c \mid x_i \sim D_f) \cdot Pr(c_j \neq c \mid x_j \sim D_f - \{x_i\})$$

$$\approx \sum_{c \in C_D} \frac{n_{c,f} + p_0 m_0}{n_f + m_0} \cdot \frac{n_f - n_{c,f} + p_0 m_0}{n_f - 1 + m_0}$$

$$Pr^{INTRA}(f) \equiv Pr(c_i = c_j \mid x_i \sim D_f \text{ and } x_j \sim D_f \text{ and } x_i \neq x_j) \quad (5)$$

$$= \sum_{c \in C_D} Pr(c_i = c \mid x_i \sim D_f) \cdot Pr(c_j = c \mid x_j \sim D_f - \{x_i\})$$

$$\approx \sum_{c \in C_D} \frac{n_{c,f} + p_0 m_0}{n_f + m_0} \cdot \frac{n_{c,f} - 1 + p_0 m_0}{n_f - 1 + m_0}$$

In a first variant of this implementation, the values of $p_0$ and $m_0$ are set to 0.5 and 1.0 and are not adjusted, i.e., the values of $Pr^{INTER}$ and $Pr^{INTRA}$ are calculated using these initial values of $p_0$ and $m_0$. This variant is also referred to as a "Laplace-corrected" variant, and the resulting values of CX(f) are minimally smoothed away from extreme values.

Figure 6:
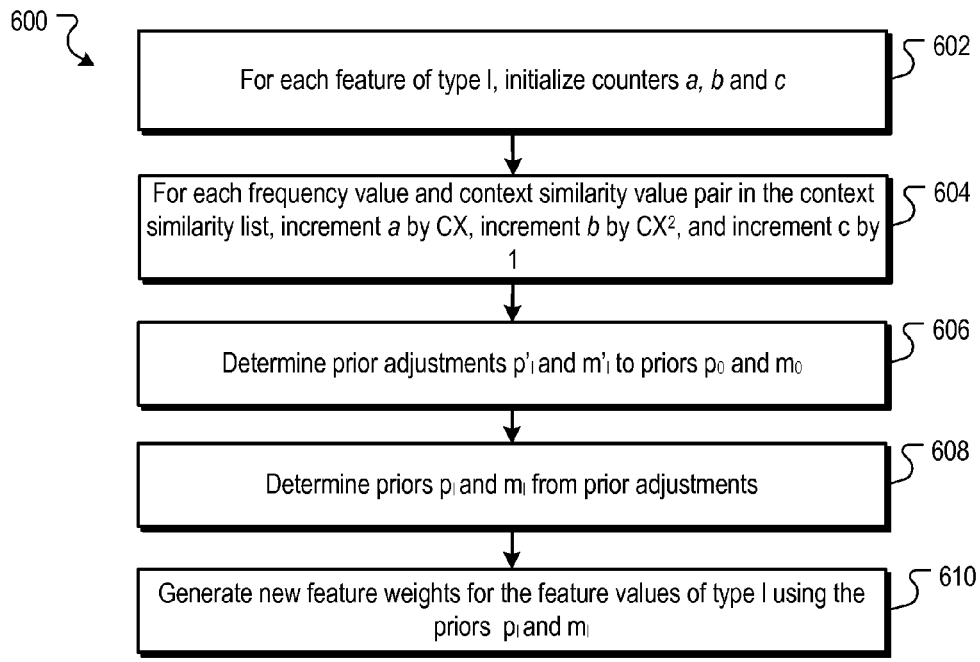
FIG. 6 is a flow diagram of an example process for generating context-dependent similarity measures with empirical priors.

In a second variant of this implementation, the CX(f) values are calculated using the Laplace-corrected variant, and then process 600 of FIG. 6 is used to calculate empirical priors. The equations (4) and (5) above are then adjusted for the empirical priors and the adjusted equations (4) and (5) are used for generating the smoothed CX(f) values.

In some implementations, the similarity function $sim_{CX \cdot IDF}$ can be bounded away from unity. This is accomplished by adding to every set of feature values a unique feature value that is included only in that set of feature values. The unique feature value has an associated feature weight $\gamma$ in a corresponding weighted vector that causes the resulting similarity score (e.g., cosine similarity value) to be less than one. In some implementations, the definition of the inner product and $\|v\|$ can be modified to implement the bounding by the unique feature $\gamma$. Let $z_{i,f}$ be the component of $z_i$ that corresponds to the feature f, and similarly for $z_{j,f}$. Then:

$$sim_{CX \cdot IDF}(x_i, x_j) \equiv \frac{z_i \cdot z_j}{\|z_i\| \cdot \|z_j\|}$$

$$= \frac{\sum_f z_{i,f} \cdot z_{j,k}}{\sqrt{\sum_f z_{i,f}^2} \sqrt{\sum_f z_{j,f}^2}}$$

$$\approx \frac{\sum_f z_{i,f} \cdot z_{j,k}}{\sqrt{\gamma + \sum_f z_{i,f}^2} \sqrt{\gamma + \sum_f z_{j,f}^2}}$$

The value of $\gamma$ can vary. In some implementations, the values can range from 0 (no bounding) to 10.

FIG. 6 is a flow diagram of an example process for generating context-dependent similarity measures with empirical priors. The process 600 can be implemented in the contextual similarity engine 112.

For each feature type l, the process initializes counters a, b and c (602). For example, the contextual similarity engine 112 can initialize counters for each disjoint set of feature values. If there are no disjoint sets, i.e., the same smoothing values are used for all features, then only one set of counters are initialized.

For each feature value and context similarity value pair in the context similarity list generated by the process 400, the process 600 increments counter a by CX, increments counter b by $CX^2$, and increments counter c by 1 (604). For example, the contextual similarity engine 112 can increment the counters for each (f, CX) pair.

The process 600 determines prior adjustments $p'_1$ and $m'_1$ to priors $p_0$ and $m_0$ (606) For example, the contextual similarity engine 112 can perform the following calculations:

$$p'_l = a_l/c_l$$

$$\sigma'_l = \sqrt{b_l/c_l - (p'-l)^2}$$

$$m'_l = (p'_l(1-p'_l)/\sigma^2)$$

The process 600 determines the priors $p_l$ and $m_l$ from the prior adjustments (608). For example, the contextual similarity engine 112 can perform the following calculations:

$$m_l = m_0 + m'_l$$

$$p_l = \frac{p'_l m'_l + p_0 m_0}{m_0 + m'_l}$$

The process 600 generates new feature weights for the feature values for the features of type l using the priors $p_l$ and $m_l$ (610). For example, the contextual similarity engine 112 can re-execute the process 400 using equation (3) and the Dirichlet-smoothed versions of equations (1) and (2) (i.e., equations (4) and (5)) wherein the priors are $m_l$ and $p_1$, and where l is the type of feature f.

Although a Dirichlet smoothing scheme has been described, other smoothing schemes can also be used.

6.0 Inverse Similarity Score Classification

A variant of CX context similarity values can be used for classification instead of similarity matching. Assuming that each class is represented by a different c. The inverse frequency weighted vector $w_i$ can be divided dividing the CX(f) weights, rather than multiplying it by the CX(f) weights. The CX(f) context similarity values increase the importance of features that are distributed across many contexts, and decrease the importance of features that are concentrated in a single context. Thus, for classification, the reverse can be accomplished by dividing the vector $w_i$ by corresponding CX(f) weights.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and an apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data and receiving user input from a user interacting with the client device). Data generated at the client device (e.g., a result of the user interaction) can be received from the client device at the server.

Figure 7:
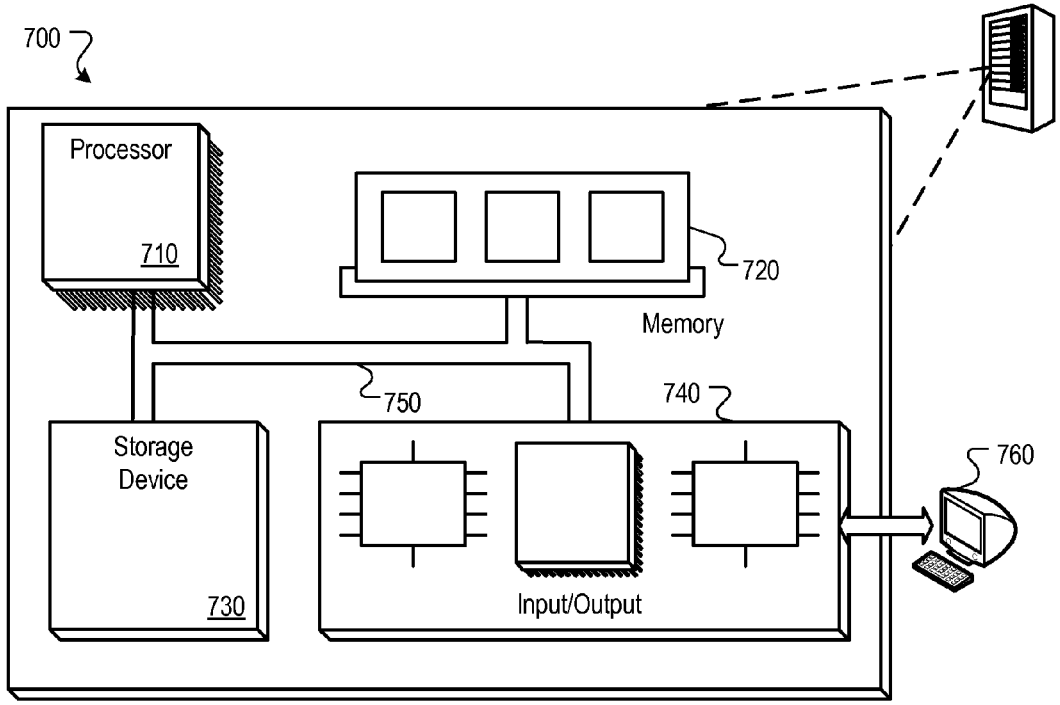
FIG. 7 is a block diagram of a programmable processing system.

An example of one such type of computer is shown in FIG. 7, which shows a block diagram of a programmable processing system (system). The system 700 that can be utilized to implement the systems and methods described herein. The architecture of the system 700 can, for example, be used to implement a computer client, a computer server, or some other computer device.

The system 700 includes a processor 710, a memory 720, a storage device 730, and an input/output device 740. Each of the components 710, 720, 730, and 740 can, for example, be interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 can, for example, include a hard disk device, an optical disk device, or some other large capacity storage device.

The input/output device 740 provides input/output operations for the system 700. In one implementation, the input/output device 740 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 760.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
    selecting, by the data processing apparatus, object representations from a dataset storing a plurality of object representations, each object representation being an association of:
        an object identifier that identifies an object instance in a dataset and corresponds to an object;
        a context value that identifies a context of the object; and
        a set of feature values that identify features of the object;
    wherein each object identifier is unique in the dataset, and each context value is associated with one or more object identifiers;
    for each feature value:
        determining an inter-context score that is proportional to the number of different context values in the dataset that are associated with the feature value, wherein the inter-context score is based on a probability that a pair of object representations that each include a particular feature value are each associated with different context values; and
        determining an intra-context score that proportional to the number of times the feature value is associated with each context value, wherein the intra-context score is based on a probability that a pair of object representations that each include the particular feature value are each associated with the same context value; and
    for a selected pair of object representations, determining a similarity score based on a respective inter-context score and a respective intra-context score of each matching feature value in the set of features for the pair of object representations, the similarity score being a measure of the similarity of the object representations in the pair of object representations, the determining comprising, for each feature value, determining a feature weight for the feature value, the feature weight being based on a ratio of the inter-context score of the feature value to the intra-context score of the feature value.

2. The method of claim 1, wherein:
    determining a similarity score comprises:
        generating a weighted vector for each set of features of the selected pair of object representations, each weighted vector having, for each feature value, a corresponding feature weight determined for the feature value; and
        determining a cosine similarity value from the weighted vectors.

3. The method of claim 2, wherein generating a weighted vector for each set of features of the selected pair of object representations comprises, for each feature value in the set of features of the selected pair of object representations:
- determining an inverse frequency value of the feature value with respect to the dataset; and
- multiplying the inverse frequency value by a logarithmic ratio of the inter-context score of the feature value to the intra-context score of the feature value.

4. The method of claim 3, further comprising, for each set of feature values in the dataset, adding a unique feature value to the set of feature values and that is included only in that set of feature values, the unique feature value having an associated feature weight in a corresponding weighted vector that causes the cosine similarity value to be less than one.

5. The method of claim 1, wherein determining the inter-context score and intra-context score comprises for each feature value in the sets of features in the dataset comprises:
- determining a number of object representations in the dataset that include the feature value;
- for each context value in the dataset, determining a number nc of objet representations including the context value;
- for each context value in the dataset, determining a number nc,f of object representations including the context value and including the feature value;
- determining the inter-context score based on a summing over each context value in the dataset values proportional to:

$$(nc_f*(nf-nc_f))/(nf*(nf-1)); \text{ and}$$

- determining the intra-context score based on a summing over each context value in the dataset values proportional to:

$$(nc_f*(nf-1))/(nf*(nf-1)).$$

6. The method of claim 5, further comprising smoothing the inter-context scores and intra-context scores by a first value p and a second value m so that determining the inter-context score is based on a summing over each context value in the dataset values equal to:

$$((n_{c,f}+p*m)*(n_f-n_{c,f}+p*m))/((n_f+m)*(n_f-1+m)); \text{ and}$$

- determining the intra-context score based on a summing over each context value in the dataset values equal to:

$$((n_{c,f}+p*m)*(n_f-1+p*m))/((n_f+m)*(n_f-1+m)).$$

7. The method of claim 6, further comprising:
- grouping the feature values into disjoint sets of feature values; and
- determining, for each disjoint set of feature values, a corresponding first value p and a correspond second value m;
- wherein the first values p differ for at least two disjoint sets of feature values, and the second values m differ for at least two disjoint sets of feature values.

8. The method of claim 1, further comprising:
- generating a context histogram for each feature value in the sets of feature values, the context histogram defining the number of times the feature value co-occurs with each context value in the dataset; and
- determining the feature weight for each feature value comprises determining the feature weight based on the context histogram of the feature value.

9. The method of claim 8, wherein generating a feature weight for each feature value based on the context histogram of the feature value comprises:
- providing a first set of context histograms to a first computer in the data processing apparatus;
- providing a second set of context histograms to a second computer in the data processing apparatus, the first and second sets of context histograms being disjoint sets; and
- determining, at the first and second computers, the respective feature weights of the feature values from the respective first and second sets of context histograms.

10. The method of claim 1, wherein the objects are products offered by merchants, and wherein the context values are the identifiers of the merchants.

11. A method performed by a data processing apparatus, the method comprising:
- selecting, by the data processing apparatus, object representations from a dataset storing a plurality of object representations, each object representation being an association of:
  - an object identifier that identifies an object instance in a dataset and corresponds to an object;
  - a context value that identifies a context of the object; and
  - a set of feature values that identify features of the object;
- wherein each object identifier is unique in the dataset, and each context value is associated with one or more object identifiers; and
- generating feature weights and associating the feature weights with the feature values in the sets of features in the dataset, the generating of feature weights comprising, for each feature value:
  - determining an inter-context score that is proportional to the number of different context values in the dataset that are associated with the feature value, wherein the inter-context score is based on a probability that a pair of object representations that each include a particular feature value are each associated with different context values; and
  - determining an intra-context score that proportional to the number of times the feature value is associated with each context value, wherein the intra-context score is based on a probability that a pair of object representations that each include the particular feature value are each associated with the same context value; and
  - determining a feature weight for the feature value, the feature weight being based on a ratio of the inter-context score of the feature value to the intra-context score of the feature value.

12. The method of claim 11, further comprising:
- selecting a pair of object representations from the dataset; and
- determining a similarity score that measures the similarity of the pair of object representations, the similarity score determined from the feature weights associated with the feature values in the set of features of each object representation in the pair of object representations.

13. The method of claim 12, wherein:
further comprising:
- generating a weighted vector for each set of features of the selected pair of object representations, each weighted vector including the feature weights for corresponding feature values; and
- determining a cosine similarity value from the weighted vectors.

14. The method of claim 13, wherein generating a weighted vector for each set of features of the selected pair of object representations comprises, for each feature value in the set of features of the selected pair of object representations:

determining an inverse frequency value of the feature with respect to the dataset; and multiplying the inverse frequency value by a logarithmic ratio of the inter-context score of the feature value to the intra-context score of the feature value.

15. The method of claim 14, further comprising, for each set of feature values in the dataset, adding a unique feature value to the set of feature values and that is included only in one set of feature values, the unique feature value having an associated weight in a corresponding weighted vector that causes the cosine similar value to be less than one.

16. A system, comprising:
a data processing apparatus in data communication with resource index data store, the resource index data indexing data of the resources and resource locators addressing the resources;
a data storage apparatus in data communication with the data processing apparatus and storing instructions executable by the data processing apparatus and upon execution by the data processing apparatus cause the data processing apparatus to perform operations comprising:
  a object identifier that identifies an object instance in a dataset and corresponds to an object;
  a context value that identifies a context of the object; and
  a set of feature values that identify features of the object;
  wherein each object identifier is unique in the dataset, and each context value is associated with one or more object identifiers;
  for each feature value:
    determining an inter-context score that is proportional to the number of different context values in the dataset that are associated with the feature value, wherein the inter-context score is based on a probability that a pair of object representations that each include a particular feature value are each associated with different context values; and
    determining an intra-context score that proportional to the number of times the feature value is associated with each context value, wherein the intra-context score is based on a probability that a pair of object representations that each include the particular feature value are each associated with the same context value; and
  for a selected pair of object representations, determining a similarity score based on a respective inter-context score and a respective intra-context score of each matching feature value in the set of features for the pair of object representations, the similarity score being a measure of the similarity of the object representations in the pair of object representations, the determining comprising, for each feature value, determining a feature weight for the feature value based on a ratio of the inter-context score of the feature value to the intra-context score of the feature value.

17. A system, comprising:
a data processing apparatus in data communication with resource index data store, the resource index data indexing data of the resources and resource locators addressing the resources;
a data storage apparatus in data communication with the data processing apparatus and storing instructions executable by the data processing apparatus and upon execution by the data processing apparatus cause the data processing apparatus to perform operations comprising:
  selecting object representations from a dataset storing a plurality of object representations, each object representation being an association of:
    an object identifier that identifies an object instance in a dataset and corresponds to an object;
    a context value that identifies a context of the object; and
    a set of feature values that identify features of the object;
    wherein each object identifier is unique in the dataset, and each context value is associated with one or more object identifiers; and
  generating feature weights and associating the feature weights with the feature values in the sets of features in the dataset the generating of feature weights comprising, for each feature value:
    determining an inter-context score that is proportional to the number of different context values in the dataset that are associated with the feature value, wherein the inter-context score is based on a probability that a pair of object representations that each include a particular feature value are each associated with different context values; and
    determining an intra-context score that proportional to the number of times the feature value is associated with each context value, wherein the intra-context score is based on a probability that a pair of object representations that each include the particular feature value are each associated with the same context value; and
    determining a feature weight for the feature value based on a ratio of the inter-context score of the feature value to the intra-context score of the feature value.

18. A computer storage medium encoded with a computer program, the program comprising instructions that when executed by data processing apparatus cause the data processing apparatus to perform operations comprising:
  selecting object representations from a dataset storing a plurality of object representations, each object representation being an association of:
    an object identifier that identifies an object instance in a dataset and corresponds to an object;
    a context value that identifies a context of the object; and
    a set of feature values that identify features of the object;
    wherein each object identifier is unique in the dataset, and each context value is associated with one or more object identifiers; and
  generating feature weights and associating the feature weights with the feature values in the sets of features in the dataset, the generating of feature weights comprising, for each feature value:
    determining an inter-context score that is proportional to the number of different context values in the dataset that are associated with the feature value, wherein the inter-context score is based on a probability that a pair of object representations that each include a particular feature value are each associated with different context values; and
    determining an intra-context score that proportional to the number of times the feature value is associated with each context value, wherein the intra-context score is based on a probability that a pair of object representations that each include the particular feature value are each associated with the same context value; and
    determining a feature weight for the feature value based on a ratio of the inter-context score of the feature value to the intra-context score of the feature value.

* * * * *

UNITED STATES PATENT AND TRADEMARK OFFICE
CERTIFICATE OF CORRECTION

| | | |
|---|---|---|
| PATENT NO. | : 8,234,285 B1 | Page 1 of 1 |
| APPLICATION NO. | : 12/506685 | |
| DATED | : July 31, 2012 | |
| INVENTOR(S) | : William W. Cohen | |

It is certified that error appears in the above-identified patent and that said Letters Patent is hereby corrected as shown below:

Cover Page, Column 1, Line 3, Other Publications – delete "Tecommendation" and insert -- Recommendation --, therefor.

Cover Page, Column 2, Line 18, Other Publications – delete "IJACI-2003" and insert -- IJCAI-2003 --, therefor.

Claim 5, Column 17, Line 19 – delete "number of" and insert -- number $n_f$ of --, therefor.

Claim 5, Column 17, Line 22 – delete "nc of objet" and insert -- $n_c$ of object --, therefor.

Claim 5, Column 17, Line 24 – delete "nc,f of" and insert -- $n_{c,f}$ of --, therefor.

Claim 5, Column 17, Line 30 – delete "(nc,f*(nf-nc,f))/(nf*(nf-1));" and insert -- $(n_{c,f}*(n_f-n_{c,f}))/(n_f*(n_f-1))$; --, therefor.

Claim 5, Column 17, Line 35 – delete "(nc,f*(nf-1))/(nf*(nf-1))." and insert -- $(n_{c,f}*(n_f-1))/(n_f*(n_f-1))$. --, therefor.

Signed and Sealed this
Sixth Day of November, 2012

David J. Kappos
*Director of the United States Patent and Trademark Office*